(12) United States Patent
Brown et al.

(10) Patent No.: US 9,193,105 B1
(45) Date of Patent: Nov. 24, 2015

(54) CASTING FINE GRAINED, FULLY DENSE, STRONG INORGANIC MATERIALS

(75) Inventors: Sam W. Brown, Knoxville, TN (US); Larry S. Spencer, Knoxville, TN (US); Michael R. Phillips, Harriman, TN (US)

(73) Assignee: Consolidated Nuclear Security, LLC, Reston, VA (US)

(*) Notice: Subject to any disclaimer, the term of this patent is extended or adjusted under 35 U.S.C. 154(b) by 714 days.

(21) Appl. No.: 13/221,970

(22) Filed: Aug. 31, 2011

(51) Int. Cl.
*B29C 45/73* (2006.01)
*B29C 45/72* (2006.01)

(52) U.S. Cl.
CPC ............... *B29C 45/72* (2013.01); *B29C 45/73* (2013.01)

(58) Field of Classification Search
CPC ... B01J 2219/0094; B29C 45/72; B29C 45/73
USPC ................... 264/519, 520, 327; 164/66.1, 120
See application file for complete search history.

(56) References Cited

U.S. PATENT DOCUMENTS

| | | | |
|---|---|---|---|
| 4,123,392 A | 10/1978 | Hall et al. | |
| H558 H | 12/1988 | Coomes et al. | |
| 5,415,354 A * | 5/1995 | Shutov et al. | 241/16 |
| 5,416,333 A | 5/1995 | Greenspan | |
| 5,553,656 A * | 9/1996 | Cook | 164/66.1 |
| 5,879,078 A * | 3/1999 | Tsuzuki et al. | 366/137 |
| 5,902,529 A * | 5/1999 | Ishikawa et al. | 264/51 |
| 7,169,489 B2 | 1/2007 | Redmond | |
| 7,380,976 B2 * | 6/2008 | Mattison et al. | 366/149 |
| 2001/0046465 A1* | 11/2001 | Rauleder et al. | 423/240 R |
| 2003/0190235 A1* | 10/2003 | Subramanian et al. | 416/241 B |
| 2004/0151915 A1* | 8/2004 | Kitahara et al. | 428/422.8 |
| 2007/0094930 A1* | 5/2007 | Bailey | 48/197 FM |
| 2009/0098192 A1* | 4/2009 | Fuisz | 424/444 |
| 2010/0072669 A1* | 3/2010 | Smith et al. | 264/328.14 |
| 2010/0323057 A1* | 12/2010 | Marumoto et al. | 425/587 |
| 2012/0088892 A1* | 4/2012 | Van Grambezen et al. | 526/348 |
| 2012/0313270 A1* | 12/2012 | Wallick et al. | 264/28 |
| 2013/0201785 A1* | 8/2013 | Dahms et al. | 366/145 |
| 2014/0346702 A1* | 11/2014 | Kelly et al. | 264/40.5 |

\* cited by examiner

*Primary Examiner* — Nahida Sultana
(74) *Attorney, Agent, or Firm* — Michael J. Renner, Esq.; Luedeka Neely Group, P.C.

(57) ABSTRACT

Methods and apparatuses for casting inorganic materials are provided. The inorganic materials include metals, metal alloys, metal hydrides and other materials. Thermal control zones may be established to control the propagation of a freeze front through the casting. Agitation from a mechanical blade or ultrasonic energy may be used to reduce porosity and shrinkage in the casting. After solidification of the casting, the casting apparatus may be used to anneal the cast part.

16 Claims, 3 Drawing Sheets

CASTING FINE GRAINED, FULLY DENSE, STRONG INORGANIC MATERIALS

GOVERNMENT RIGHTS

The U.S. Government has rights to this invention pursuant to contract number DE-AC05-00OR22800 between the U.S. Department of Energy and Babcock & Wilcox Technical Services Y-12, LLC.

FIELD

This disclosure relates to the field of inorganic material casting. More particularly, this disclosure relates to control of grain structures shrinkage and porosity during inorganic material casting.

BACKGROUND

Casting may be used to form articles that are used "as cast," but generally cast parts are subject to further material processing operations such as machining, forging, rolling, or extruding. Many casting operations result in undesirable amounts of porosity and shrinkage. Often these problems are not identified until either the "as cast" article fails or subsequent material processing operations uncover the problem with the cast part. What are needed therefore are improved methods for reliably casting materials.

SUMMARY

The present disclosure provides a method of forming an inorganic material casting. The method typically includes providing a charge of molten inorganic material in a vessel having a vessel bottom and a plurality of thermal control zones from a bottom thermal control zone to a top thermal control zone. The method generally involves cooling the vessel bottom to a temperature so that a first portion of cast inorganic material with a freezing front is formed, and the method generally proceeds with cooling the vessel at the plurality of thermal control zones in sequence from the bottom thermal control zone to the top thermal control zone such that the freezing front moves upward through the molten inorganic material until all of the molten inorganic material solidifies and forms the inorganic material casting.

In some embodiments the charge of inorganic material includes lithium hydride. In such embodiments the step of providing a charge of molten inorganic material in a vessel includes disposing solid lithium hydride in the vessel. Typically the lithium hydride is then heated to no more than 10° C. below its melting temperature to form heated lithium hydride. The heated lithium hydride has a hydrogen partial pressure, and a cover blanket of hydrogen is disposed over the heated lithium hydride, where the cover blanket of hydrogen has a pressure greater than the heated lithium hydride hydrogen partial pressure.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred and other embodiments, reference is made to the accompanying drawings, which form a part hereof, and within which are shown by way of illustration the practice of specific embodiments of methods and apparatuses for casting inorganic materials. It is to be understood that other embodiments may be utilized, and that structural changes may be made and processes may vary in other embodiments.

Figure 1:
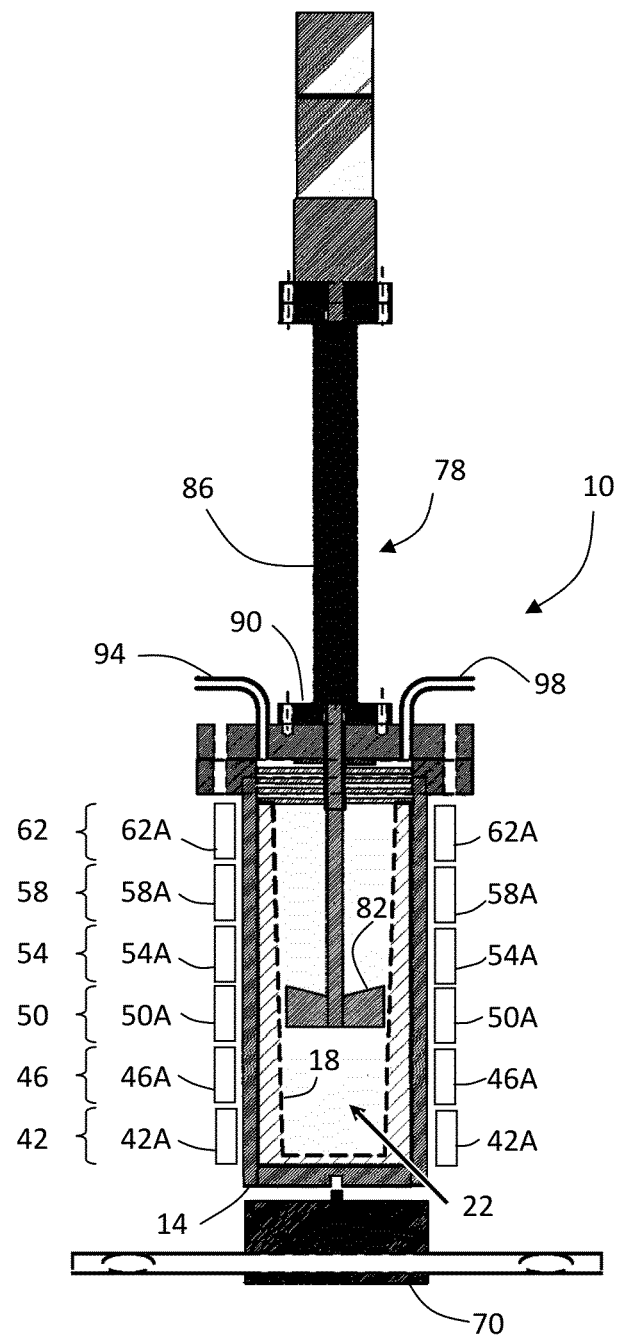
FIG. 1 is a somewhat schematic illustration of a system for casting an inorganic material.

FIG. 1 illustrates a casting system 10 for molten casting of inorganic materials. The term "inorganic material" as used herein refers to metals, and/or metal alloys, and/or metal hydrides, and/or any other material that is not an organic compound (i.e., any other material that does not contain a carbon bond in which at least one carbon atom is covalently linked to an atom of hydrogen, oxygen or nitrogen). Ceramics (e.g., oxides, carbides, and nitrides) may also be cast using the casting system 10, but such materials typically have such a high melting temperature that molten casting may not be practical. The casting system 10 has a casting vessel 14 and a holding pot 18 is disposed within the casting vessel 14. A casting cavity 22 is formed in the holding pot 18. The inorganic material component to be cast is formed in the casting cavity 22. In the embodiment of FIG. 1 the casting system 10 includes six thermal control zones, 42, 46, 50, 54, 58, and 62. In other embodiments a casting system may include more or fewer than six thermal control zones. Thermal control zone 42 is the bottom thermal control zone and thermal control zone 62 is the top thermal control zone. The temperature of the holding pot 18 in each thermal control zone 42, 46, 50, 54, 58, and 62 is substantially established by a corresponding thermal moderator 42A, 46A, 50A, 54A, 58A and 62A. Each thermal moderator 42A, 46A, 50A, 54A, 58A, and 62A circumscribes the casting vessel 14. Each thermal moderator 42A, 46A, 50A, 54A, 58A, and 62A typically utilizes an active heating element (such as an induction coil or an electric filament). The thermal moderators 42A, 46A, 50A, 54A, 58A, and 62A are used to establish different temperatures at different elevations in the casting vessel 14 and the holding pot 18 and the cast part in the casting cavity 22. The thermal moderators 42A, 46A, 50A, 54A, 58A and 62A may incorporate a passive cooling element such as radiator fins. In some embodiments the thermal moderators 42A, 46A, 50A, 54A, 58A, and 62A may incorporate active cooling elements such as refrigeration coils. The term "forced cooling" as used herein refers to process steps that involve the use of active cooling elements to lower a temperature.

One example of the use of forced cooling is with respect to a chiller block 70 that is provided with the casting system 10. The chiller block 70 is depicted in a disengaged configuration in FIG. 1. When the chiller block 70 is used for forced cooling, the bottom of the casting vessel 14 is positioned in contact with the top of the chiller block 70.

FIG. 1 also illustrates an agitator 78. The agitator 78 includes an agitator head 82. A bellow seal 86 and a ferro-fluidic seal 90 permit the agitator head 82 to move up and down through a substantial part of the casting cavity 22 during casting operations. In the embodiment of FIG. 1 the agitator head 82 is a mechanical stirring blade. In other embodiments the agitator head may be an ultrasonic transducer. The casting system 10 further includes an evacuation port 94 and a process gas port 98.

Conventional casting processes typically use a "fixed gradient cooling process." In a fixed gradient cooling process a casting is cooled by natural convection and radiant dissipation of heat, and freezing occurs substantially uniformly at each elevation of the casting, progressing from the outer edge of the casting to the center of the casting. In contrast, the casting system 10 may be used for processes referred to herein as "dynamic gradient cooling." In a "dynamic gradient cooling process" a freezing front moves upward through successive elevation heights of the casting in sequence from a bottom elevation to a top elevation (i.e., from the bottom thermal control zone to the top thermal control zone).

In a typical dynamic gradient cooling process, an inorganic material to be cast is placed in the casting vessel 14 of the casting system 10. As previously noted, a casting system (such as the casting system 10 of FIG. 1) may include a holding pot, such as the holding pot 18. In such embodiments the inorganic material is placed in the holding pot 18 in the casting vessel 14. Alternately, the holding pot 18 may be omitted and the inorganic material may be placed directly in the casting vessel 14. The holding pot 18 may be used to provide material compatibility with the inorganic material stock, and/or to provide geometric control to achieve a desired net shape, and/or to provide convenient storage of the inorganic material after it is cast. Such benefits may not be available without the use of the holding pot 18. Often the holding pot 18 is a "sacrificial" mold that, after the casting process is complete, is destroyed to remove the cast part. When the casting vessel is used to melt the inorganic material stock, the thermal moderators 42A, 46A, 50A, 54A, 58A and 62A are activated in the heating mode to melt the inorganic material to its melting temperature and form a molten inorganic material. In alternate embodiments molten inorganic material is poured into the holding pot 18 (or into the casting vessel 14 if the holding pot is not used) to begin the casting process. It is important to recognize that in processes disclosed herein the entire mass of an inorganic material is provided in a molten state (referred to herein as a "charge of molten inorganic material") at a point in time before solidification of any of the inorganic material begins. This is in contrast to "zone melting" (or "zone refining" or "floating zone") processes in which a narrow region of an ingot of inorganic material (such as a crystal) is molten, and this molten zone is moved along the ingot (typically by pulling the ingot through a heated region) and a molten region melts comparatively impure solids at its forward edge and leaves a wake of purer material solidified behind it as molten zone moves through the ingot. In such zone melting processes the entire mass of inorganic material is never molten at the same time. That is, a "charge of molten inorganic material" is not provided by these other processes.

After the charge of inorganic material in the casting vessel 14 is molten, the thermal moderator 42A may then be placed in a cooling mode to reduce the temperature of the thermal control zone 42. This cooling mode may be achieved by simply turning off the active heating of the thermal moderator 42A. The bottom of the casting vessel 14 then cools to a temperature such that a bottom portion of the molten inorganic material freezes to form a cast inorganic material portion in at least a portion of the thermal control zone 42. A preferred embodiment includes force cooling the chiller block 70 at the vessel bottom. This further cools the cast inorganic material portion and forming a freezing front that progresses upward through the casting vessel 14 and freezes further cast inorganic material portions of the molten inorganic material. To assist the upward propagation of the freeze front, the heating mode of the thermal moderators 46A, 50A, 54A, 58A, and 62A are turned off in succession starting with thermal moderator 46A and finishing with thermal moderator 62A. The upper elevation thermal moderators remain in the heating mode as lower elevation thermal moderators are turned off. This has the effect of cooling the vessel at the plurality of thermal control zones in sequence from the bottom thermal control zone (42) to the top thermal control zone (62). In embodiments where the thermal moderators 46A, 50A, 54A, 58A, and 62A include active cooling elements, the thermal moderators 42A, 46A, 50A, 54A, 58A, and 62A may be placed in force cooling modes to force cool further cast inorganic material portions until all of the molten inorganic material is solidified.

The process of dynamic gradient cooling, with a commensurate faster cooling rate, retards grain growth (i.e., produces smaller grain sizes) in the casting. Dynamic gradient cooling may also produce a grain-refining effect, such that the variance in grain size is reduced compared to many other casting techniques. This process may also purify the cast inorganic material. This purification may occur where impurities have a greater solubility in liquid inorganic material compared with solidifying inorganic material, and hence impurities are transported upward as the freeze front moves upward. An adaptation of this principle may be employed where the casting system 10 is used to melt the inorganic material being cast. During such melting the inorganic material may be heated from the bottom up, by sequentially turning on the heating mode of the thermal moderators 46A, 50A, 54A, 58A, and 62A through the plurality of thermal control zones 42, 46, 50, 54, 58 and 62, to melt the inorganic material stock.

A common problem in inorganic material casting is shrinkage of the cast part. A thirty percent reduction in volume from the molten state to the solid state is typical for many casting operations. Shrinkage is typically manifested by a sunken region at the top of a casting. Such shrinkage is deleterious because the sunken profile generally does not represent the desired shape of the cast part. As previously noted, the casting system 10 of FIG. 1 includes an agitator 78. The agitator 78 may be used to stir the molten inorganic material as it solidifies. This forms a lumpy, slushy mix that tends to reduce the shrinkage of the cast part. Without being bound by any scientific theory, the formation of the slushy mix is thought to reduce shrinkage through the formation of solidified particles that are "pre-shrunk." In embodiments where the agitator 78 comprises a mechanical stirring blade, the electric current through the motor turning the blade may be monitored to determine when the slushy mix is nearing the point of solidification and the blade should be raised to avoid being embedded in the cast part. As also previously noted, the agitator 78 may comprise an ultrasonic horn. Again without being bound by any scientific theory, the ultrasonic energy is thought to disrupt the formation of grain boundaries, such that the ultrasonic energy tends to reduce grain size in the finished casting.

Once the casting has solidified it may be cooled. It is generally beneficial to employ a controlled cooling thermal profile. For example, the cast inorganic material may be cooled uniformly at a cooling rate of between 3° C. per hour and 8° C. per hour until an annealing temperature is reached. Then the cast inorganic material may be at the annealing temperature for an annealing period to reduce a residual stress in the solid inorganic material and form annealed grain-refined inorganic material. Finally the annealed grain-refined inorganic material may be cooled to room temperature.

Figure 2:
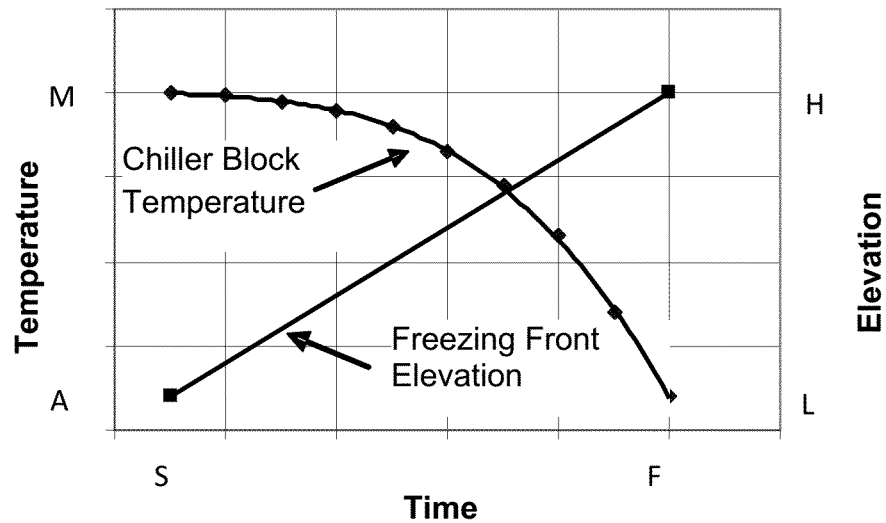
FIG. 2 is a graph illustrating boundary conditions for a finite element model of a casting process.
Figure 3:
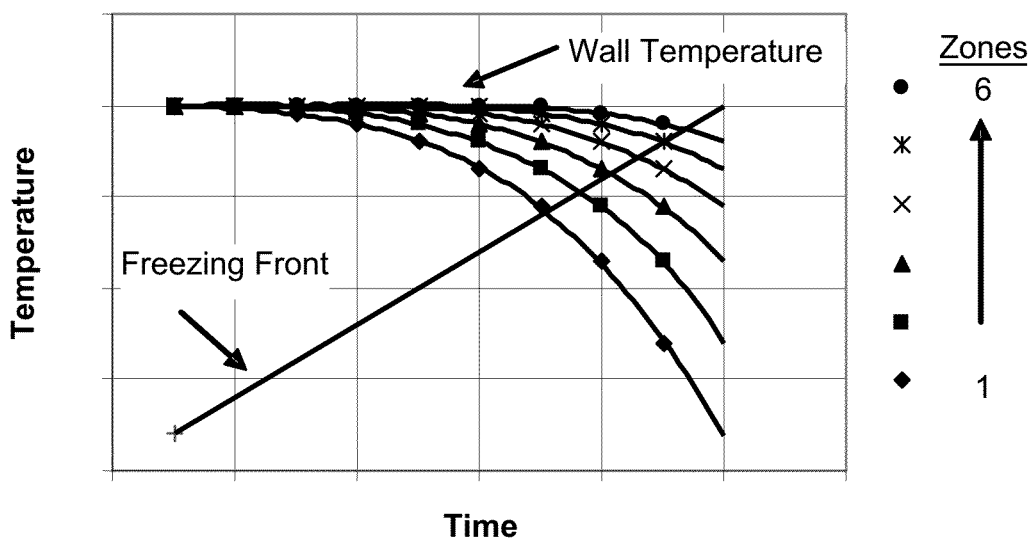
FIG. 3 is a graph illustrating the results of a finite element model when programmed with feedback functions that achieve the boundary conditions of FIG. 2.

Finite element modeling may be used to predict the performance of casting system 10 of FIG. 1. FIG. 2 illustrates two boundary conditions for such a model as applied to the solidification process. It is desirable that at the start of solidification (time "S") the freezing front be at the lowest elevation ("L") of the casting vessel (e.g., the casting vessel 14 of FIG. 1). At time "S" the temperature of the chiller block (e.g., the chiller block 70 of FIG. 1) is at "M"—the melting temperature of the inorganic material. As forced cooling is provided to the chiller block its temperature falls and the elevation of the freezing front increases. At the finish point (time="F"), the chiller block is at temperature "A," the annealing temperature of the inorganic material, and the freezing front is at the top (highest—"H") elevation. FIG. 3 illustrates the results of the finite element model when programmed with feedback functions that achieve the boundary conditions of FIG. 2.

Figures 4A, 4B, 4C:
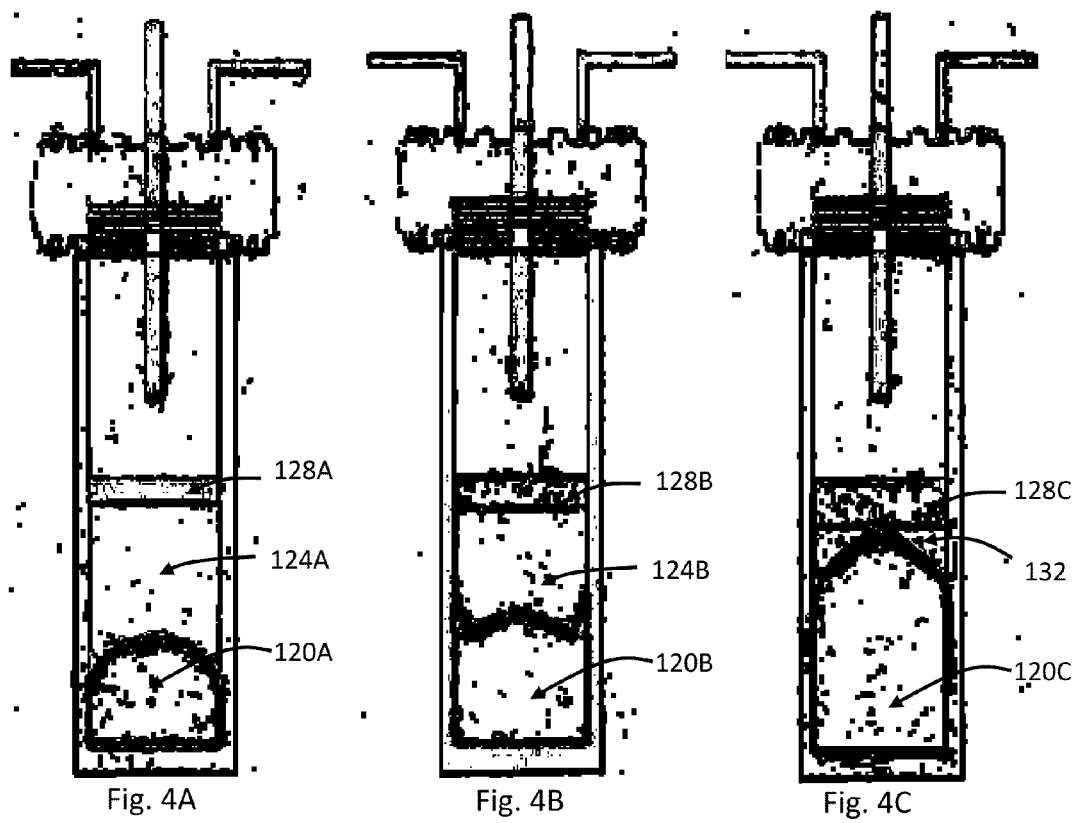
FIGS. 4A, 4B, and 4C illustrate successive states of a casting process predicted by a finite element model.

FIGS. 4A, 4B, and 4C illustrate the progression of the solidification process under the modeling conditions of FIGS. 2 and 3. In FIG. 4A the region 120A is solidified and region 124A is molten. The region 128A illustrates the volume reduction of the total material caused by the initial solidification. As illustrated in FIG. 4B as solidification progresses the solid region 120B has increased in size (compared with solid region 120A of FIG. 4A) and the molten region 124B has decreased in size (compared with the molten region 124A of FIG. 4A). The region of volume reduction caused by the further solidification of material (128B) has increased in size compared with region 128A of FIG. 4A). In FIG. 4C the entire casting has solidified as illustrated by solid region 120C. The region 128C represents the near final shrinkage in volume caused by the solidification of material. Region 132 is small liquid region remaining just prior to the total solidification of all starting material.

Figures 5A, 5B, 5C:
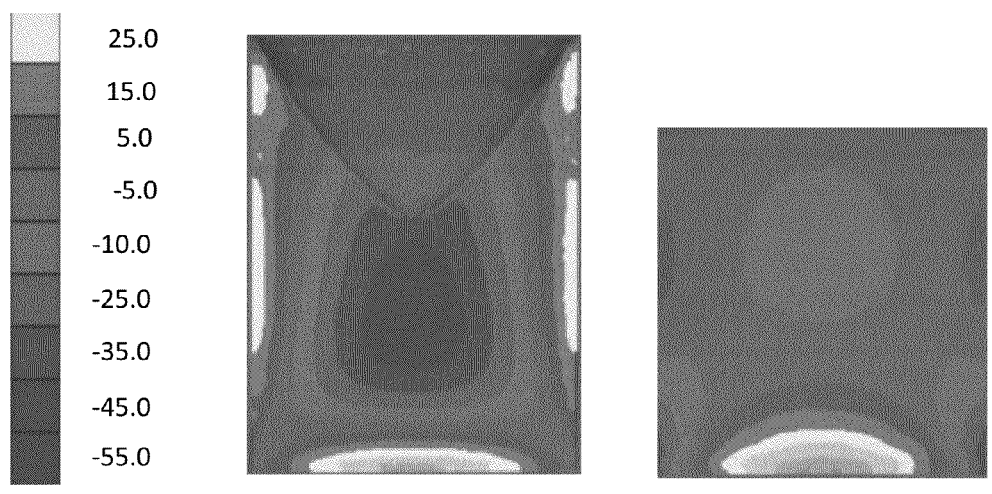
FIG. 5A is a gray-scale graphical key for residual stresses in a cast part, as predicted by a finite element model.
FIG. 5B is a graphical representation of residual stresses in a casting prepared with conventional casting techniques.
FIG. 5C is a graphical representation of residual stresses in a casting prepared using dynamic gradient cooling techniques.

Embodiments of the dynamic gradient cooling processes described herein may be used to reduce residual stresses in a casting. This is beneficial where the casting will be machined to a finished shape because residual stresses in the casting may warp the finished product. FIG. 5A is a scale indicating stress levels predicted by the previously-discussed finite element model. Positive values represent tensile stress and negative values represent compressive stress. FIG. 5B depicts the predicted residual stresses in a casting made with a fixed gradient cooling process and FIG. 5C depicts the predicted residual stresses in a casting made with a dynamic gradient cooling process.

Example

The casting of lithium hydride structures has historically suffered from a number of issues including low density due to the shrink holes and low mechanical strength due to large grain structures. Consequently, powdered metallurgy approaches have generally been used instead of casting to produce structural lithium hydride materials. (The term "lithium hydride" is used herein to encompass both lithium hydride and lithium deuteride and combinations thereof.) A problem frequently encountered with lithium hydride powdered metallurgy processes is that the combination of high surface area powders and high reactivity of lithium hydride with moisture vapors at room temperature often results in significant contamination within the finished powdered metallurgy product. In addition, the powdered metallurgy approach generally involves a significant number of process steps, which increases costs.

As an alternative to powdered metallurgy, it has been found that fine-grained, fully dense and very strong castings of lithium hydride may be formed using the dynamic gradient cooling processes disclosed herein. To test these processes lithium hydride material was placed inside an iron holding pot (such as the holding pot 18 of FIG. 1) that was surrounded by a structural stainless steel vessel (such as the casting vessel 14 of FIG. 1). In an alternate example process, lithium metal (instead of lithium hydride) was placed in the iron holding pot. An evacuation port (such as evacuation port 94 of FIG. 1) was used to remove gases from the casting cavity 22 and then the outer walls of the stainless vessel were heated by a multi-zoned heating approach to the point of melting the lithium hydride contained in the holding pot. A process gas port (such as process gas port 98 of FIG. 1) was used to place a cover blanket of hydrogen gas above the molten pool. (In tests involving lithium deuteride, deuterium was substituted for the hydrogen.) The hydrogen gas pressure was set at a pressure greater that the hydrogen partial pressure in the lithium hydride to prevent thermal decomposition of the lithium hydride into lithium and hydrogen. In alternate tests where lithium metal was initially placed in the iron holding pot, the hydrogen (or deuterium) gas reacted with the lithium metal forming lithium hydride (or lithium deuteride).

Once the lithium hydride was melted, force cooling was then initiated to a lower chiller block (e.g., the chiller block 70 of FIG. 1) causing a freezing front to proceed from the bottom of the cast structure towards the top. As the freezing front passed through each of the multi-zoned side wall heaters zones, the control temperature for that zone was reduced below the melting point of the lithium hydride (680° C.) thereby accelerating the freezing rate. The procedure of freezing from the bottom upward apparently provided a molten pool of materials to backfill any shrinkage voids as the casting solidified, thereby producing a fully dense casting. In several tests, the grain size was further reduced by either mechanical stirring of the melt or by ultrasonic disruption of grain growth. This enhancement provided higher mechanical strength in the final product compared with conventional casting and conventional powder metallurgy processes.

Once the casting was frozen, the cooling rate was controlled at a rate between 3 and 8° C. per hour until an annealing temperature was reached. The solid cast structure was held at the annealing temperature for a period sufficient to allow residual stresses to relax. After the annealing period, the cast structure was again controlled-cooled to room temperature at a rate of between 3 and 8° C. per hour. Once at room temperature, the structural stainless steel vessel was opened and the iron holding pot containing the cast lithium hydride was removed. The sacrificial iron holding pot was mechanically torn away from the casting leaving a fine grained, fully dense, strong lithium hydride machining blank.

In summary, embodiments disclosed herein disclose methods of casting an inorganic material, and in particular, methods of casting lithium hydride. The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A method of forming an inorganic material casting comprising:
   (a) providing a charge of molten inorganic material in a vessel having a vessel bottom, and a plurality of thermal control zones from a bottom thermal control zone to a top thermal control zone, wherein the molten inorganic material is simultaneously disposed in each of the plurality of thermal control zones and wherein each of the plurality of thermal control zones includes a thermal moderator operable to establish a desired temperature for the corresponding thermal control zone that is different than the temperatures of the thermal control zones at different elevations;
   (b) cooling the vessel bottom to a temperature wherein a first portion of cast inorganic material with a freezing front is formed; and
   (c) cooling the vessel at the plurality of thermal control zones in sequence from the bottom thermal control zone to the top thermal control zone such that the freezing front moves upward through the molten inorganic material until all of the molten inorganic material solidifies and forms the inorganic material casting.

2. The method of claim 1 wherein step (a) comprises:
   (i) disposing a solid inorganic material in the vessel; and
   (ii) heating the plurality of thermal control zones in sequence from the bottom thermal control zone to the top thermal control zone to provide the charge of molten inorganic material.

3. The method of claim 1 wherein step (b) comprises force cooling a chiller block at the vessel bottom.

4. The method of claim 1 wherein step (b) comprises force cooling a chiller block at the vessel bottom and step (c) comprises force cooling the plurality of thermal control zones in sequence from the bottom thermal control zone to the top thermal control zone.

5. The method of claim 1 further comprising agitating the molten inorganic material while the freezing front moves upward through the molten inorganic material.

6. The method of claim 1 further comprising:
   (d) cooling the cast inorganic material at a cooling rate of between 3° C. per hour and 8° C. per hour until an annealing temperature is reached;
   (e) holding the cast inorganic material at the annealing temperature for an annealing period to reduce a residual stress in the solid inorganic material and form annealed grain-refined inorganic material; and
   (f) cooling the annealed grain-refined inorganic material to room temperature.

7. A method of forming cast lithium hydride comprising:
   (a) disposing solid lithium hydride in a vessel having a vessel bottom and a plurality of thermal control zones from a bottom thermal control zone to a top thermal control zone;
   (b) heating the lithium hydride to form heated lithium hydride having a heated lithium hydride hydrogen partial pressure; and
   (c) disposing a cover blanket of hydrogen over the heated lithium hydride, the cover blanket of hydrogen having a pressure greater than the heated lithium hydride hydrogen partial pressure;
   (d) cooling the vessel bottom to a temperature wherein a freezing front is formed in a first portion of the heated lithium hydride; and
   (e) cooling the vessel at the plurality of thermal control zones in sequence from the bottom thermal control zone to the top thermal control zone such that the freezing front moves upward through the heated lithium hydride until all of the heated lithium hydride solidifies and forms the cast lithium hydride.

8. The method of claim 7 further comprising:
   (f) cooling the cast lithium hydride at a cooling rate of between 3° C. per hour and 8° C. per hour until an annealing temperature is reached;
   (g) holding the cast lithium hydride at the annealing temperature for an annealing period to reduce a residual stress in the cast lithium hydride and form annealed grain-refined lithium hydride; and
   (h) cooling the annealed grain-refined lithium hydride to room temperature.

9. The method of claim 7 wherein each of the plurality of thermal control zones includes a thermal moderator operable to establish a desired temperature for the corresponding thermal control zone that is different than the temperatures of the thermal control zones at different elevations.

10. The method of claim 7 wherein the lithium hydride is heated in step (b) to no more than 10° C. below its melting temperature.

11. A method of forming an inorganic material casting comprising:
    (a) providing a charge of lithium hydride in a vessel having a vessel bottom and a plurality of thermal control zones from a bottom thermal control zone to a top thermal control zone, wherein the charge of lithium hydride is simultaneously disposed in each of the plurality of thermal control zones;
    (b) cooling the vessel bottom to a temperature wherein a freezing front is formed in a first portion of the lithium hydride; and
    (c) cooling the vessel at the plurality of thermal control zones in sequence from the bottom thermal control zone to the top thermal control zone such that the freezing front moves upward through the charge of lithium hydride until all of the lithium hydride solidifies and forms the inorganic material casting.

12. The method of claim 11 wherein each of the plurality of thermal control zones includes a thermal moderator for establishing different temperatures for each of the plurality of thermal control zones.

13. The method of claim 11 wherein step (a) comprises:
    (i) disposing solid lithium hydride in the vessel; and
    (ii) heating the plurality of thermal control zones in sequence from the bottom thermal control zone to the top thermal control zone to provide the charge of lithium hydride.

14. The method of claim 11 wherein step (b) comprises force cooling a chiller block at the vessel bottom.

15. The method of claim 11 wherein step (b) comprises force cooling a chiller block at the vessel bottom and step (c) comprises force cooling the plurality of thermal control zones in sequence from the bottom thermal control zone to the top thermal control zone.

16. The method of claim 11 further comprising agitating the molten inorganic material while the freezing front moves upward through the molten inorganic material.

* * * * *